July 16, 1963 — S. BELFIORE — 3,097,469

ROTARY LAWN MOWER BLADE

Filed June 19, 1962

INVENTOR.
SAMUEL BELFIORE
BY
Kimmel & Crowell
ATTORNEYS.

United States Patent Office 3,097,469
Patented July 16, 1963

3,097,469
ROTARY LAWN MOWER BLADE
Samuel Belfiore, 602 East Ave., Elyria, Ohio
Filed June 19, 1962, Ser. No. 203,595
1 Claim. (Cl. 56—295)

This invention relates to a lawn mower blade, for rotary lawn mowers, and has as its primary object the provision of an improved blade characterized by a smooth annular rim or bead, thus obviating the use of cutter teeth or the like around the periphery of the blade, and providing increased safety to the user of the mower.

An additional object of the invention is the provision of a blade of this character wherein the cutting member is comprised of cup-shaped concaved portion stamped directly from the face of a disc, having their edges sharpened and hardened, so that the cutting function is performed interiorly of the blade rim, so that in the event that the foot of the operator slips beneath the blade, by accident, protection is afforded by the space between the rim and the concaved cutting edges.

A further object of the invention is the provision of a blade of this character which is of particular strength, and due to its even distribution, serves not only as a fly wheel for the motor shaft, but also as a protection for the same from high grass, tough weeds, and obstacles such as stones or the like and other similar obstructions.

A further object of the invention is the provision of a device of this character wherein complementary concaved cutting surfaces are stamped on opposite sides of the device so that in the event that the blade becomes worn or dull through excessive usage, the same may be merely reversed, presenting, in effect, a new blade.

A further object of the invention is the provision of a device of this character wherein the concaved cup-shaped cutting surfaces which present radially straight but axially arcuate cutting surfaces form in effect suction cups to draw the grass to be cut upright into the path of the cutter blades.

Still another object of the invention is the provision of a device of this character which is sturdy and durable in construction, reliable and efficient in operation, and relatively simple and inexpensive to manufacture, install, and utilize.

Other objects reside in the combinations of elements, arrangements of parts, and features of construction, all as will be more fully pointed out hereinafter and disclosed in the accompanying drawing wherein there is shown a preferred embodiment of this inventive concept.

Figure 1:
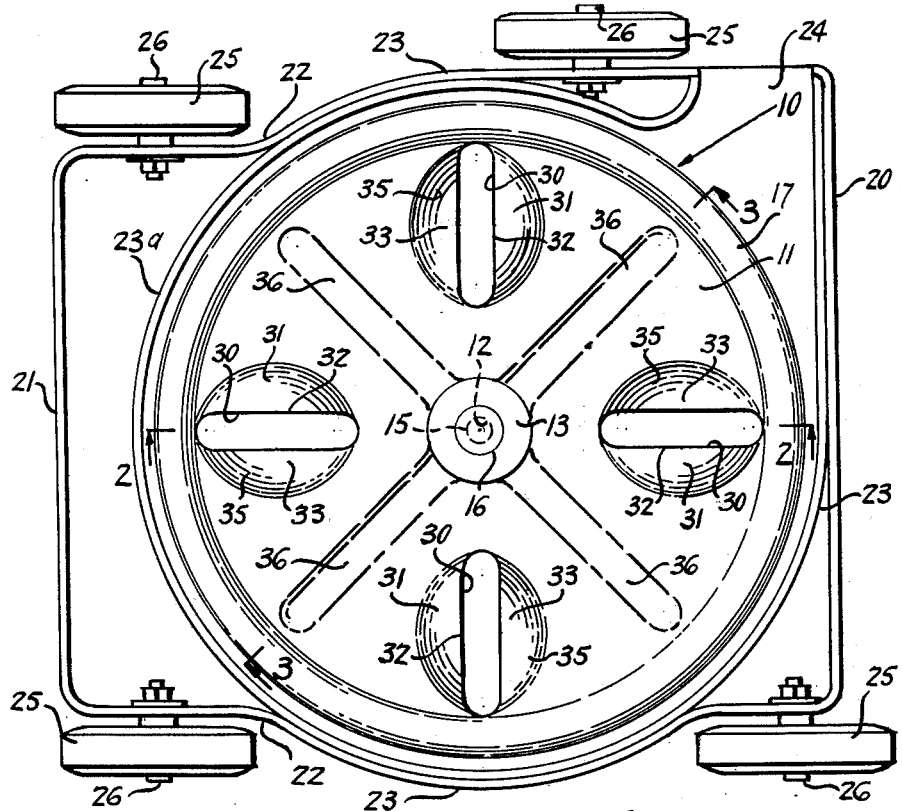
FIGURE 1 is a top plan view of the blade of the instant invention shown in association with the frame of a conventional rotary lawn mower, parts of the latter being omitted for the sake of clarity.

Having reference now to the drawing in detail, the blade of the instant invention is generally indicated at 10, and comprises a substantially flat circular disc 11. Disc 11 is provided with a central opening 12, and on opposite faces thereof is provided with washers 13 having openings 14 in alignment with a central opening 12. Washers 13 are welded or otherwise suitably secured to the disc, and the aligned central openings are adapted for the reception of the drive shaft 15 of a conventional rotary lawn mower, the shaft being secured in position by oppositely disposed locking nuts 16 in conventional manner. The outer periphery of disc 11 is surrounded by a bead 17, which may be of any desired material, and welded or otherwise suitably secured about the periphery of the disc, obviating the necessity of any cutting teeth or the like about the edges of the blade, and serving as a material safety factor. In the mounting of the device the blade is positioned within a frame which is characterized by a front transverse member 20, a corresponding rear member 21 connected by side frame members 22 outwardly bowed as at 23 to accommodate the maximum periphery of the disc, and forming a depending flange like frame about the blade. In addition, the blade is surrounded by a depending flange 23a of approximately one inch in height, which protects the foot from accidentally slipping beneath the bead 17 and the edge of the blade. A side opening 24 of conventional design is provided in one of the side flanges 22 to permit the mown grass to exit from the mower. The usual wheels 25 mounted on stub axles 26 are also provided, and suitable power means and a handle for the mower (not shown), also of conventional design, are employed.

Figure 2:
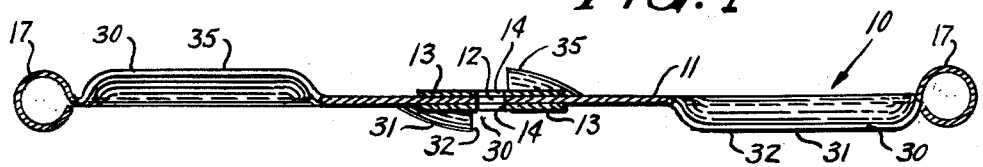
FIGURE 2 is an enlarged sectional view taken substantially along the line 2—2 of FIGURE 1 as viewed in the direction indicated by the arrows.
Figure 3:
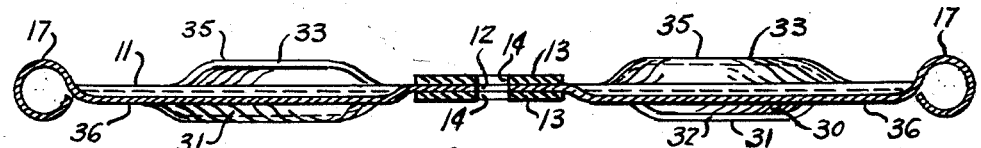
FIGURE 3 is an enlarged sectional view taken substantially along the line 3—3 of FIGURE 1 as viewed in the direction indicated by the arrows.

Referring back now to the blade 11, it will be seen that the blade is provided with a plurality of radial slots 30, on each side of which is stamped out a cutting cup or blade 31, the blades having straight edges radially of the blade, as shown at 32 but which edges are arcuate axially of the blade as indicated at 33 in FIGURE 3. In the illustrative embodiment of the invention herein shown, there are four slots 30, and four concaved blade members 31 which depend from one side of the disc. The edges 32 of the cup-shaped blades are hardened and sharpened to afford a sharp cutting edge, which will evenly mow a strip of lawn or the like. The concaved blades 31 are tapered rearwardly into flush relation with the surface of disc 11, as best seen in FIGURE 2, and, in addition to creating cutting edges, provide in effect suction cups which draw the grass upright into contacting relation with the edges 32 of the blades.

On opposite sides of each slot 30 similar cups 35 are provided but are concaved upwardly of the plane of the blade, the cups 35 being identical to the previously described cups 31, except for their opposite positioning, the arrangement being such that by removal of the nut 16 blade 10 may be removed and reversed, in the event that the cutting edges 32 become dull, and thereby introducing a complete new set of cutting edges on the lower side thereof, it being understood that only the lower cutting surfaces on the grass, the blade being rotated, obviously, in a direction so that the cuting edges 32 strike the grass.

By virtue of the instant invention it will be seen that there is therein provided a blade for rotary lawn mowers together with a mounting therefor which increases the safety factor of such blades to a very high degree, rendering it extremely difficult for the cutting edges 32 in any instance to strike against the foot of the operator of the device.

It will also be seen that there is herein provided an improved blade, which accomplishes all the objects of this invention, and others, including many advantages of great practical utility.

It may here be pointed out that radial ribs 36 may be stamped or otherwise formed in the material of the disc for reinforcing purposes, and extend between the cutting cups 35 and 31, as best illustrated in FIGURE 1.

As many embodiments may be made of this inventive concept, and as many modifications may be made in the embodiment hereinbefore shown and described, it is to be understood that all matter herein is to be interpreted merely as illustrative, and not in a limiting sense.

I claim:

A rotary lawn mower blade comprising a disc having a central opening for the rotating shaft of a lawn mower; reinforcing washers on each side of said disc surrounding said opening, radical reinforcing ribs stamped in said disc and extending from said washers to points adjacent to the periphery of said disc, said disc having a plurality of radial slots therein, a pair of concaved cutting cups formed one on either side of each slot with the cups of each pair being oppositely concaved, the edges of each cup being arcuate axially of the disc and straight radially of the disc to define cutting edges adjacent each slot on each side of said disc, said concaved cups tapering rearwardly into fluid relation with the surface of the disc to provide a suction effect, and a relatively large annular bead about the periphery of said disc.

References Cited in the file of this patent

UNITED STATES PATENTS

| | | |
|---|---|---|
| 2,621,568 | Fletcher | Dec. 16, 1952 |
| 2,902,814 | Lewis et al. | Sept. 8, 1959 |
| 2,917,826 | Pohr | Dec. 22, 1959 |
| 3,059,400 | Plummer | Oct. 23, 1962 |